United States Patent [19]

Aida et al.

[11] Patent Number: 5,298,560
[45] Date of Patent: Mar. 29, 1994

[54] PARTIALLY CROSSLINKED THERMOPLASTIC RESIN COMPOSITION

[75] Inventors: Fuyuki Aida, Sumida; Masaaki Miyazaki, Yokohama; Mamoru Nagai, Kawasaki, all of Japan

[73] Assignee: Nippon Petrochemicals Company, Limited, Tokyo, Japan

[21] Appl. No.: 699,742

[22] Filed: May 14, 1991

[30] Foreign Application Priority Data

May 14, 1990 [JP] Japan .................. 2-121113

[51] Int. Cl.$^5$ .............................. C08L 23/26
[52] U.S. Cl. ........................ 525/192; 525/164; 525/177; 525/184; 525/193; 525/194; 525/92; 525/95; 525/98; 525/211; 525/227; 525/232; 525/237; 525/240; 525/262; 525/279; 525/282; 525/290; 525/326.1; 525/331.7; 525/332.5; 525/332.8; 525/333.7; 525/385; 525/386; 524/505; 524/525; 524/528
[58] Field of Search ............... 525/282, 326.1, 332.5, 525/385, 193, 240, 194, 191, 290, 192, 177, 184, 386, 279, 262, 331.7, 332.8; 264/211.24, 211.12

[56] References Cited

U.S. PATENT DOCUMENTS

| | | | |
|---|---|---|---|
| 3,806,558 | 4/1974 | Fischer | 525/198 |
| 4,093,567 | 6/1978 | Hurwitz et al. | 525/332.2 |
| 4,104,210 | 8/1978 | Coran et al. | 525/232 |
| 4,130,535 | 12/1978 | Coran et al. | 525/487 |
| 4,311,628 | 1/1982 | Abdou-Sabet et al. | 525/447 |
| 4,636,554 | 1/1987 | Tada et al. | 525/332.2 |
| 4,650,830 | 3/1987 | Yonekura et al. | 525/193 |
| 4,737,547 | 4/1988 | White | 525/193 |
| 4,857,254 | 8/1989 | Wong | 264/211.24 |
| 4,876,313 | 10/1989 | Lorah | 525/282 |
| 4,948,840 | 8/1990 | Berta | 525/193 |
| 5,159,016 | 10/1992 | Inoue et al. | 525/193 |

FOREIGN PATENT DOCUMENTS 54-19421 2/1979 Japan .

Primary Examiner—James J. Seidleck
Assistant Examiner—M. L. Warzel
Attorney, Agent, or Firm—Scully, Scott, Murphy & Presser

[57] ABSTRACT

A partially crosslinked thermoplastic resin composition is prepared by dynamically heat-treating a thermoplastic resin (A) in the presence of a carbon radical inducing agent (B) comprising a charge transfer complex or a combination of a hydrogen donating compound and a hydrogen accepting compound.

5 Claims, No Drawings

PARTIALLY CROSSLINKED THERMOPLASTIC RESIN COMPOSITION

BACKGROUND OF THE INVENTION

The present invention relates to a useful thermoplastic resin composition and more particularly to a thermoplastic resin composition prepared by dynamically heat-treating a thermoplastic resin using a carbon radical inducing agent and well-balanced in rigidity, impact resistance, flexibility and moldability.

Thermoplastic resins are used in various industrial fields as materials superior in moldability. The utilization field of thermoplastic resins has been expanded by blending them for modification with heterogeneous or homogeneous resins or fillers having various properties. Further, various attempts have been made for attaining effects of such blending, e.g. improvement of impact resistance and heat resistance, by heat-treating the resulting mixtures dynamically. As an example, there is known a process of heat-treating a thermoplastic resin dynamically using an organic peroxide.

However, the composition obtained by such process using an organic peroxide is desired to be remedied in the following points although it has advantages. For example, as shown in U.S. Pat. No. 3,806,558, a free radical forming agent typified by organic peroxides is used, so in the case where the thermoplastic resin used is an organic peroxide non-crosslinked type resin such as, for example, a polypropylene resin, although the resulting composition will exhibit good fluidity during injection molding, the organic peroxide remaining in the composition will deteriorate the thermal stability and weathering resistance and there will occur a thermal decomposition of the organic peroxide rapidly, resulting in that a molecular cutting reaction is unavoidable, thus leading deterioration of mechanical characteristics such as yield tensile strength, bending strength and flexural modulus.

Besides, if the said composition is used in extrusion or blow molding, there will arise such problems as deteriorated anti-drawdown property, surface roughening of parison and deficient elongation. It has also been pointed out that when the composition is used in injection molding, the gloss of the resulting molded product is deteriorated, thus affecting the beauty of the product as commodity.

On the other hand, in the case where the thermoplastic resin used is an organic peroxide crosslinked type resin such as a polyethylene resin, it becomes difficult to perform molding because the fluidity of the resulting composition is deteriorated markedly, so it is required that the amount of an organic peroxide used be extremely small. In this case, it is difficult to handle such trace amount of an organic peroxide. Further, in the use of an organic peroxide there inevitably arise problems in point of stability and safety during storage and dynamic heat treatment of a free radical forming agent, as well as thermal decomposition loss caused by the deposition on the inner wall of a processing machine. Therefore, it has been desired to solve these problems.

The following processes are known as processes for crosslinking a thermoplastic resin containing rubber and having a carbon-carbon unsaturated bond.

As the first process, the use of a sulfur-based crosslinking agent is proposed in U.S. Pat. No. 4,130,535. However, when such thermoplastic resin is dynamically heat-treated in the presence of a sulfur-based crosslinking agent, which causes the formation of sulfur radical, not only a very offensive odor is emitted at an ordinary kneading temperature, but also the resulting composition emits an offensive odor. This offensive odor of the composition is emitted again in a plasticizing step during molding, thus deteriorating the commercial value markedly. Moreover, since this composition is colored in deep yellowish red, the coloring freedom of the composition is restricted. Further, during use over a long period, there may occur discoloration due to bleeding of the sulfur compound and hence the application field is restricted.

As the second process, it is proposed in U.S. Pat. No. 4,311,628 and Japanese Patent Publication No. 19421/1979 to use a crosslinking agent comprising a halogenated phenolic resin or a phenol-formaldehyde resin with a halide incorporated therein. However, since the active halogen is liberated during crosslinking reaction, the resulting composition is discolored to black and thus the coloring freedom is lost. Besides, the fluidity of the composition is not good.

As the third process, in the above Japanese Patent Publication No. 19421/1979 it is proposed to use a quinone dioxime compound for crosslinking. However, since quinone dioximes are dark purple, the coloring freedom of the resulting composition is greatly restricted, and a pungent odor is emitted during dynamic heat treatment. Also as to the composition obtained by this process, it cannot be said that the fluidity thereof during molding is good.

As the fourth process, in U.S. Pat. Nos. 4,104,210 and 4,130,535 there is shown an example of using a bismaleimide compound or a combined use thereof with a thiazole compound. In the former, N,N'-m-phenylene bismaleimide is used for a highly unsaturated diene rubber, but it must be used in a large amount for attaining a predetermined crosslinking effect, thus giving rise to problems such as coloration of the resulting composition and bleeding of unreacted portion. In the latter, N,N'-m-phenylene bismaleimide is also used in polypropylene/EPDM system, but as to the effect of modification by dynamic heat treatment, extremely unsatisfactory results have been reported. Further, since bismaleimide compounds are generally expensive, the use thereof in a large amount causes an increase of cost.

Thus, although various crosslinking processes are known, it is desired to develop a more efficient process.

Having made extensive studies in view of the above-mentioned points, the present inventors found out a crosslinking reaction using a carbon radical inducing agent not causing a reckless and excessive crosslinking reaction as a drawback of organic peroxides in the prior art. It is the object of the invention to provide a thermoplastic resin composition prepared by such crosslinking reaction of a thermoplastic resin using a carbon radical inducing agent and free of the drawbacks of the conventional processes.

SUMMARY OF THE INVENTION

As a result of having made studies earnestly along the above-mentioned object, the present inventors found out that a partially crosslinked thermoplastic resin composition obtained by dynamically heat-treating a thermoplastic resin in the presence of a carbon radical inducing agent could afford remarkably excellent results in comparison with the use of a conventional crosslinking agent.

More specifically, the present invention resides in a partially crosslinked thermoplastic resin composition prepared by dynamically heat-treating a thermoplastic resin (A) in the presence of a carbon radical inducing agent (B) which is formed from a material containing a charge transfer complex or a material containing both a hydrogen donating compound and a hydrogen accepting compound.

Detailed Description of the Invention

The present invention will be described in detail hereinunder.

As examples of the thermoplastic resin(s) used in the present invention there are mentioned substantially crystalline polyolefin resins such as crystalline polypropylene, propylene-α-olefin random block copolymers, high and medium density polyethylenes, polybutene-1, poly-4-methylpentene-1, high pressure process low-density polyethylenes, linear low-density polyethylenes, very low density polyethylenes, ethylene-unsaturated carboxylate copolymers, and ethylene-carboxylic acid unsaturated ester copolymers; as well as polystyrene resins, polyacrylonitrile resins, poly(meth-)acrylate resins, polyamide resins, polyester resins, polycarbonate resins, polyphenylene resins, polyphenylene ether resins, polyphenylene sulfide resins, polyphenylene sulfone resins, polyacetal resins, and mixtures thereof.

The thermoplastic resin used in the invention may contain a rubbery substance. Examples of such rubbery substance include ethylene-α-olefin copolymer rubbers such as ethylene-propylene random copolymer rubber and ethylene-propylene-diene random copolymer rubber, 1,2-polybutadiene, styrene-butadiene-styrene block copolymer rubber, styrene-isoprene-styrene block copolymer rubber, natural rubber, nitrile rubber, and isobutylene rubber. These may be used each alone or as mixtures. Particularly, ethylene-propylene random copolymer rubber and ethylene-propylene-diene random copolymer rubber are preferred. These two rubbers, as compared with the other rubbery substances, are superior in thermoplasticity and can be easily dispersed by melt kneading. Besides, they do not have any peculiar odor in comparison with SBR, isoprene rubber, nitrile rubber and butadiene rubber. Further, the two rubbers in question are available as pellets so are easy to weigh and handle in the mixing operation, and also as to the type of the composition manufacturing apparatus, they have a high degree of freedom in selection. Thus, they have advantages in operation.

As the diene component in the above ethylene-propylene-diene random copolymer rubber there may be used any of known dienes, including ethylidene norbornene, 1,4-hexadiene and dicyclopentadiene.

In the present invention, a wide variety of crosslinked thermoplastic resin compositions having various characteristics can be obtained by changing the kind and proportion of the thermoplastic resin used. The thermoplastic resin to be used can be selected optionally from among those exemplified above. For example, a combination of a polyolefin resin and a heterogeneous thermoplastic resin, a combination of polyolefins with each other, or a combination of a polyolefin resin and a rubbery substance, can be selected. In this case, since the heterogeneous thermoplastic resin is melt-kneaded with a polyolefin resin or a rubbery substance, it is preferable that the heterogeneous thermoplastic resin be selected from among thermoplastic resins which are relatively close in melting point or softening point to the polyolefin resin or the rubbery substance.

In the case of combining polyolefin resins with each other, a combination of polypropylene and ethylene (co)polymer is a preferable combination because it is superior in the balance of physical properties and can be obtained inexpensively. Polypropylenes are superior in heat resistance and rigidity, and ethylene (co)polymers are widely available, ranging from those rich in flexibility up to those rich in rigidity, typical of which are high pressure process low-density polyethylenes, high density polyethylenes, linear low-density polyethylenes, very low density polyethylenes, ethylene-unsaturated carboxylate copolymers, and ethylenecarboxylic acid unsaturated ester copolymers. Compositions obtained using these polyolefin resins alone can satisfy a wide range of physical properties.

A combination of a polyolefin resin just exemplified above and a rubbery substance is also a preferable combination, which can satisfy a wider range of physical properties than in the combination of only polyolefin resins. For example, the low-temperature impact resistance can be improved remarkably.

As to a concrete blending ratio, it is preferable that the proportion of the polyolefin resin be in the range of 20 to 100wt% and that of the rubbery substance 0 to 80wt%. An amount of the rubbery substance exceeding 80wt% is not desirable because it becomes difficult to effect processing.

In the present invention, a softening agent may be used during and/or after the heat treatment. As the soften agent there may be used an oil commonly called extender oil which is used mainly for the improvement of processability in rubber processing, for attaining an extending effect, or for improving the dispersibility of filler. Such extender oils are high-boiling petroleum components, which are classified into paraffinic, naphthenic and aromatic components. In addition to these petroleum distillates, synthetic oils such as liquid polyisobutene, are also employable.

The carbon radical inducing agent used as an essential component in the dynamic heat treatment comprises a charge transfer complex or a combination of a hydrogen donating compound and a hydrogen accepting compound.

The charge transfer complex is used as a combination of compounds. In this combination, upon formation of the complex, an electric charge is transferred from one compound to the other for radical cleavage of unsaturated bond. Various known combinations are employable for this purpose if only there is a difference in the electron density of unsaturated bond. As preferred examples of compounds which are low in the electron density of unsaturated bond there are mentioned maleimide compounds (e.g. N,N'-m-phenylene bismaleimide and N,N'-ethylene bismaleimide) and unsaturated carboxylic acid derivatives (e.g. maleic anhydride and ethylene glycol dimethacrylate). Bismaleimide compounds are preferred because even if there remains a compound which has not participated in the radical formation, it functions as an ordinary crosslinking aid. In the case of unsaturated carboxylic acid derivatives, a compound which has not been concerned in the radical formation reacts graftwise with the thermoplastic resin and creates the action as an adhesive or as a compatibilizing agent. Therefore, when it is desired to attain such effect, the use of an unsaturated carboxylic acid derivative is particularly preferred. As the compound which forms a charge transfer complex together with such unsaturated carboxylic acid derivative there is used a compound which is high in the electron density of unsaturated bond. Examples are α-methylstyrene, trans-stilbene, vinylferrocene, 4-vinylpyridine, 2-isopropenylnaphthalene, N-vinylcarbazole, N-vinylindole, and indole. Also, there are mentioned cyclic vinyl ethers typified by furan, 3,4-dihydro-2-pyran and 4H-chromene; furan derivatives typified by furfuryl alcohol, furfuryl aldehyde, benzofuran and furfuryl acetate; straight-chain vinyl ether compounds typified by n-octadecyl vinyl ether and ethyl vinyl ether; enol ethers and enol esters of carbonyl compounds such as ketones, esters, lactones, aldehydes, amides and lactams typified ketene acetal, isopropenyl acetate and 1-amino-1-methoxyethylene; alkenyl acetate, 1,2-dimethoxyethylene, p-dioxene, 2-chloroethyl vinyl ether, 2-phenylalkenyl ether, heptafluoroisopropyl alkenyl ether, ethyl vinyl sulfide, styrylalkenyl thioether, p-oxadiene, cyclopentene, cyclohexene, divinyl ether, butadiene, isoprene, 1,3-pentadiene, 1,4-pentadiene, and dimethyldivinylsilane.

It is preferable that the said complex be present as radical without forming an alternating copolymer.

Next, the combination of a hydrogen donating compound and a hydrogen accepting compound indicates a combination wherein hydrogen atom is transferred from the former to the latter and both are radicalized. The hydrogen donating compound indicates a compound which per se can be stabilized resonantly even after the release of hydrogen radical. When viewed from the standpoint of characteristics, this compound indicates a compound which when reacted at 350° C., 50 atm. (in a nitrogen gas atmosphere), for 30 minutes in the absence of catalyst, exhibits an amount of hydrogen transfer from this compound to anthracene as a hydrogen acceptor of at least 0.1 (hydrogen atom/mol anthracene). Examples are. octahydrophenanthrene, tetralin, indene, tetrahydrofuran, 2,3-dihydrobenzofuran, and fluorene. Particularly, octahydrophenanthrene, octahydroanthracene, tetralin, indene and fluorene are superior in that they are available easily and do not decompose esters and amides and in that the resulting compositions are not colored. The hydrogen accepting compound is a compound which is not so highly stabilized resonantly as radical after the addition of hydrogen radical thereto. Usually there is employed a compound which is used as a crosslinking aid in the crosslinking of rubber using a peroxide. As examples there are mentioned polyfunctional vinyl monomers typified by trimethylolpropane trimethacrylate, ethylene glycol di(-meth)acrylate, triallyl (iso)cyanurate, and diallyl phthalate. However, in view of the high reactivity as radical, it is desirable to use maleimide compounds (e.g. N,N'-m-phenylene bismaleimide) and unsaturated carboxylic acid derivatives (e.g. maleic anhydride and ethylene glycol dimethacrylate). These inducing agents may be used each alone or in combination.

A particularly preferred combination comprises (B1) a compound having an unsaturated bond of a high electron density or a hydrogen donating compound and (B2) a compound having an unsaturated bond of a low electron density or a hydrogen accepting compound. A combination comprising a compound as (B1) selected from (α) ether compounds, (β) tetrahydroaromatic compounds and (γ) cyclopentane compounds and a compound as (B2) selected from (δ) bismaleimide compounds and (ε) polyol unsaturated ester compounds is high in activity and particularly preferred.

The ether compounds (α) may be straight-chained or cyclic and may contain a substituent group. Examples are cyclic ethers such as 1,3-dioxolane and 1,4-dioxane; straight-chain ethers such as ethyl ether and isopropyl ether; non-aromatic cyclic vinyl ethers typified by 3,4-dihydro-2-pyran and 4H-chromene; furan derivatives typified by furfuryl alcohol, furfuryl aldehyde, benzofuran and furfuryl acetate; straight-chain vinyl ether compounds typified by n-octadecyl vinyl ether and ethyl vinyl ether; enol ethers and enol esters of carbonyl compounds such as esters, lactones, aldehydes, amides and lactams typified by ketene acetal, isopropenyl acetate, vinyl acetate and 1-amino-1-methoxyethylene. These compounds may contain substituent groups. Alkyl-substituted compounds as well as derivatives substituted with various elements and functional groups are employable. And these compounds may be used each alone or as mixtures. Particularly, vinyl or alkenyl ethers are preferred.

The tetrahydroaromatic compounds (β) indicate compounds containing one or more aromatic rings, at least one of which is tetrahydrogenated. The aromatic ring as referred to herein indicates a ring structure having $4n+2$ (n is an integer) of π-electrons shown in the definition of aromaticity [see, for example, "Yuki Kagaku-no Kiso," Tokyo Kagaku Dojin K.K. (1976), translated by Toshio Goto, pp. 105-106, (Richard S. Monson & John C. Shelton, "Fundamentals of Organic Chemistry," MacGraw-Hill, Inc. (1974)]. Benzene and naphthalene are included as examples, while pyran is excluded. Therefore, examples of the tetrahydroaromatic compounds employable in the present invention include tetrahydro derivatives of naphthalene. Further, the tetrahydroaromatic compounds employable in the invention may contain substituent groups. Alkyl-substituted compounds, as well as derivatives substituted with various elements and functional groups, are also employable.

The tetrahydroaromatic compounds employable in the invention can be prepared by a known chemical reaction. Examples of those available at present are 1,2,3,4-tetrahydronaphthalene, tetrahydrobenzene, and tetrahydrofuran. Polymers of these compounds are also employable.

The cyclopentane compounds (γ) indicate compounds containing at least one cyclopentane, cyclopentene or cyclopentadiene skeleton. That is, the cyclopentane compounds (γ) are compounds of a five-membered ring which is constituted by only carbon atoms. Examples are cyclopentane, cyclopentene, cyclopentadiene, dicyclopentadiene, indene, indane, and fluorene. Of course, these compounds may contain substituent groups. Alkyl-substituted compounds and derivatives substituted with various elements and functional groups are employable. And these compounds may be used each alone or as mixtures.

Preferred examples of the bismaleimide compounds (δ) are ethylene bismaleimide and N,N'-m-phenylene bismaleimide.

As examples of the polyol unsaturated ester compounds (ε) there are mentioned higher esters of methacrylic acid, typical of which are trimethylolpropane methacrylate and ethylene glycol dimethacrylate.

In addition to the components (δ) and (ε) exemplified above there also are employable polyfunctional vinyl monomers, typical of which are divinylbenzene, triallyl isocyanurate, and diallyl phthalate. These compounds may be used in combination.

In the present invention, a mixture comprising components obtained as above is subjected to a dynamic heat treatment to afford a resin composition. The dynamic heat treatment as referred to herein means increasing the value of boiling xylene insolubles content in the composition after melt-kneading of the mixture in comparison with the value before the melt-kneading. The effects of the present invention are attained by this heat treatment. Generally, the higher the boiling xylene insolubles content, the more remarkable the improvement of various effects, including that of impact resistance.

The temperature of the dynamic heat treatment should be not lower than the melting point or softening point of the thermoplastic resin used and below the decomposition point of the resin. Preferably, the melt kneading is performed using a mixing machine which affords a high shear rate to facilitate the formation of radical in the mixture.

The boiling xylene insolubles content is increased mainly by adjusting the amount of the carbon radical inducing agent used, which amount can be selected optionally. An appropriate amount is adopted on the basis of the kind of the carbon radical inducing agent used, the type of the melt-kneading apparatus used and conditions for the melt kneading. If the carbon radical inducing agent is used in an excessive amount, there will occur bleeding of the components added, coloration of the resulting composition, or increase of cost. Therefore, the amount of the carbon radical inducing agent to be used may be restricted in consideration of these points. A practical amount is usually in the range of 0.01 to 7, preferably 0.05 to 5, parts by weight based on 100 parts by weight of the resin used.

The dynamic heat treatment can be carried out using any of known melt-kneading apparatus, including open type mixing rolls, non-open type Bumbury's mixer, extruder, kneader, and twin-screw extruder. In the composition described above the dynamic heat treatment is preferably conducted at a kneading temperature of 120° to 350° C. and for 20 seconds to 20 minutes as a heat treatment time.

If necessary, in the composition of the present invention there may be incorporated stabilizer, anti-oxidant, ultraviolet ray absorber, lubricant, foaming agent, antistatic agent, dye, pigment, glass fiber, carbon fiber, inorganic filler, flame retardant, etc.

According to the present invention, as described above, an excessive crosslinking reaction which is a drawback involved in the use of a conventional crosslinking agent can be suppressed by dynamically heat-treating a thermoplastic resin using a carbon radical inducing agent. By using such a dynamically heat-treated thermoplastic resin it is made possible to obtain a composition which is crosslinked partially to a desired extent in the range from a very slightly crosslinked state up to a greatly crosslinked state. Besides, physical properties could be improved remarkably.

[Examples and Comparative Examples]

The present invention will be described below concretely using working and comparative examples, but it is to be understood that the invention is not limited thereto.

EXAMPLES 1–21 AND COMPARATIVE EXAMPLES 1–21

As thermoplastic resins (A) there were used polypropylene resin, low density polyethylene resin, high density polyethylene resin, linear low-density polyethylene resin, very low density polyethylene resin, ethylene-propylene random copolymer rubber, ethylene-ethyl acrylate copolymer, and polyamide resin.

How to Prepare Composition 3 parts by weight of a carbon radical inducing agent (B1) selected from ($\alpha$), ($\beta$), ($\gamma$) and 2 parts by weight of a carbon radical inducing agent (B2) selected from ($\delta$), ($\epsilon$) were mixed with 100 parts by weight of a thermoplastic resin (A) referred to above (various combinations were used as set forth in Table 1). The resulting mixture was melt-kneaded in a Plastomill (20R200, a product of Toyo Seiki K K.) under the conditions of reaction temperature 230° C, reaction time 5 minutes and 60 r.p.m. In the melt-kneading operation, torque was observed. After the reaction, boiling xylene insolubles content was determined.

The resulting composition was formed into a 30 $\mu$ thick film using a 40 mm-dia. extruder (L/D=20) under the conditions of spiral die diameter 125 mm and lip 2 mm, blow ratio 1.8 and processing temperature 200° C. Then, physical properties of the film were measured.

The results obtained are as shown in Table 2, in which the results of Comparative Examples were obtained by kneading without using a carbon radical inducing agent and in which the "Torque" is represented in terms of rise ( ↑ ) or unchanged (→).

Testing and Measuring Methods (Yield Tensile Strength)

According to ASTM D882. (Boiling Xylene Insolubles Content)

A 20 mm×50 mm×0.2 mm film formed by pressing was put on a 120-mesh wire gauze and immersed in boiling xylene for 5 hours. Then, the weight of the film before the immersion and that after the immersion were measured, and a boiling xylene insolubles content was determined from the following equation:

$$\text{Boiling xylene insolubles content (wt \%)} = \frac{\text{Film weight (g) after immersion in boiling xylene}}{\text{Film weight (g) before immersion in boiling xylene}} \times 100$$

EXAMPLES 22–46 AND COMPARATIVE EXAMPLES 22–49

Mixtures of components selected from polypropylene resin, high density polyethylene resin, linear low-density polyethylene resin, polystyrene resin, polyamide resin, polyester resin and ethylene-propylene random copolymer rubber were used. Test pieces were prepared by subjecting injection-molded products to an annealing treatment unless otherwise described.

The following are how to prepare compositions, conditions for preparing test pieces by injection molding and testing methods.

How to Prepare Composition

1) The above thermoplastic resins were mixed in predetermined proportions using a Henschel mixer.

2) Predetermined amounts of carbon radical inducing agents (B1) and (B2) were added to the mixtures obtained above, followed by melt-kneading for dynamic heat treatment at resin temperatures of 180–260° C. and a revolution of 200 r.p.m., using a continuous twin-screw kneader/extruder (diameter: 30 mm, a product of Plastic Kogaku Kenkyu-Sho K.K.).

| Conditions for Injection Molding | |
|---|---|
| Molding Machine: | IS-90B (a product of Toshiba Machine Co., Ltd. |
| Injection Pressure: | 1,000 kg/cm$^2$ |
| Molding Temperature: | 180–260° C. |
| Mold temperature: | 50° C. |

Testing and Measuring Methods (MFR)

According to JIS K6760 K6758 and K7210.

(Ultimate Tensile Strength) and (Ultimate Elongation Length)

According to JIS K6760, K6758, K7113, and ASTM D882.

(Flexural Modulus)

According to JIS K6758 and K7203.

(Vicat Softening Temperature)

According to JIS K6760, K6758 and K7206.

(Izod Impact Value)

According to JIS K6758 and K7110.

(Crystallization Temperature)

Crystallization temperature was measured as an index of cycle time in injection molding. Since the higher the crystallization temperature, the higher the crystallizing speed, it can be considered that the cycle time in injection molding can be shortened. Using a differential scanning calorimeter (SSC/580, a product of Seiko Denshi Kogyo K.K.), about 10 mg of a sample was held at 210° C. for 5 minutes, then cooled at a rate of 10° C./min, and the temperature exhibiting a peak in the resulting exotherm curve was used as a crystallization temperature.

The results obtained are as shown in Tables 3 to 5, in which the proportions of carbon radical inducing agents are based on 100 parts by weight of the thermoplastic resins (this also applies to the tables which follow those tables).

EXAMPLES 47–54 AND COMPARATIVE EXAMPLES 50–56

As thermoplastic resins there were used 70–90wt% of very low density polyethylenes. Test pieces were prepared by forming a flat plate of 100 mm×200 mm×2 mm by injection molding and then punching the flat plate into a predetermined size. The composition preparing process was the same as above, provided in the melt-kneading step 2) there were used resin temperatures in the range of 150° to 220° C., and where required, a mineral oil- or synthetic oil-based softening agent was added from a reciprocating fixed displacement pump connected to a vent hole.

The following testing methods were used.

Testing and Measuring Methods (High Load MFR)

According to JIS K7210, at a temperature of 230° C. and a load of 10 kg.

(Ultimate Tensile Strength) and (Ultimate Elongation Length)

According to JIS K6301, at a pulling rate of 200 mm/min.

(Durometer Hardness, H$_c$A)

According to ISO 868.

(Permanent Elongation)

According to JIS K6301, 100% elongation, using No. 3 dumbbell.

(Vicat Softening Temperature)

According to JIS K7206, at a load of 250 g.

(Brittle Temperature)

According to JIS K6760 and K7216.

(Abrasion Resistance)

According to JIS K7204 (using a Taber abrasion tester), at a load of 1,000 g and continuous 1,000 revolutions.

The results obtained are as shown in Table 6. The proportion of the softening agent in Table 6 is based on 100 parts by weight of the total resin weight (also in Table 7).

EXAMPLES 55–62 AND COMPARATIVE EXAMPLES 57, 58

Mixtures of components selected from polypropylene resin, low density polyethylene resin, very low density polyethylene resin, ethylene-ethyl acrylate copolymer resin and ethylene-propylene random copolymer rubber were used. How to prepare compositions and test pieces and conditions for injection molding to prepare test pieces are the same as in Examples 47–54.

Testing methods are as follows.

Testing and Measuring Methods (Spiral Flow)

A sample was prepared by injection molding using a mold having a cavity of a certain spiral and under the following molding conditions. Then, the length of the spiral thus formed was measured to check the melt flow property of the sample. Conditions for Injection Molding

| Conditions for Injection Molding | |
|---|---|
| Molding Machine: | IS-90B (a product of Toshiba Machine Co., Ltd.) |
| Injection Pressure: | 1,000 kg/cm$^2$ |
| Molding Temperature: | 230° C. |
| Stroke: | 25 mm |
| Injection Time: | 15 sec |
| Curing Time: | 10 sec |
| Interval Time: | 3 sec |
| Mold: | Archimedes type, Temperature 50° C. |

(Bending Strength)

According to JIS K6758 and K7203.

(Durometer Hardness, $H_DD$)

According to JIS K6760 and K7215.

(Surface Roughening and Elongation of Parison)

Parison was formed in the same manner as above, using an extruder for blow molding, and then visually checked and evaluated for the state of its surface and elongation. The evaluation was made in the following three stages: ⊚: Very Good, ○: Good, ×: Bad The results obtained are as shown in Table 6.

The following are the thermoplastic resins, carbon radical inducing agents, etc. used in the above Examples and Comparative Examples.

Thermoplastic Resin (A)

A1. Very low density polyethylene, Nisseki Softrex D9010, d=0.900 g/cm³, MFR 0.9, a product of Nippon Petrochemicals Co., Ltd.

A2. Very low density polyethylene, Nisseki Softrex D9005, d=0.900 g/cm³, MFR 0.5, a product of Nippon Petrochemicals Co., Ltd.

A3. Very low density polyethylene, Nisseki Softrex D9550, d=0.905 g/cm³, MFR 5.0, a product of Nippon Petrochemicals Co., Ltd.

A4. Polypropylene, Nisseki Polypro J120G, MFR 1.5, a product of Nippon Petrochemicals Co., Ltd.

A5. Polypropylene, Nisseki Polypro J130G, MFR 4.0, a product of Nippon Petrochemicals Co., Ltd.

A6. Polypropylene, Nisseki Polypro J150G, MFR 8.0, a product of Nippon Petrochemicals Co., Ltd.

A7. Polypropylene, Nisseki Polypro J160G, MFR 14, a product of Nippon Petrochemicals Co., Ltd.

A8. Polypropylene, Nisseki Polypro J170G, MFR 30, a product of Nippon Petrochemicals Co., Ltd.

A9. Polypropylene, Nisseki Polypro J420G, MFR 1.5, a product of Nippon Petrochemicals Co., Ltd.

A10. Polypropylene, Nisseki Polypro J630G, MFR 4.0, a product of Nippon Petrochemicals Co., Ltd.

A11. Polypropylene, Nisseki Polypro J650G, MFR 8.0, a of Nippon Petrochemicals Co., Ltd.

A12. Polypropylene, Nisseki Polypro J871M, MFR 23, a product of Nippon Petrochemicals Co., Ltd.

A13. Polypropylene, Nisseki Polypro J880G, MFR 40, a product of Nippon Petrochemicals Co., Ltd.

A14. Linear low-density polyethylene, Nisseki Linirex AF1210, d=0.920 g/cm³, MFR 0.8, a product of Nippon Petrochemicals Co., Ltd.

A15. Linear low-density polyethylene, Nisseki Linirex AJ5610, d=0.934 g/cm³, MFR 10, a product of Nippon Petrochemicals Co., Ltd.

A16. Linear low-density polyethylene, Nisseki Linirex AJ6820, d=0.942 g/cm³, MFR 30, a product of Nippon Petrochemicals Co., Ltd.

A17. Linear low-density polyethylene, Nisseki Linirex AJ6285, d=0.916 g/cm³, MFR 32, a product of Nippon Petrochemicals Co., Ltd.

A18. Low density polyethylene, Nisseki Rexlon F102, d=0.922 g/cm³, MFR 0.25, a product of Nippon Petrochemicals Co., Ltd.

A19. Low density polyethylene, Nisseki Rexlon F22, d=0.924 g/cm³, MFR 1.0, a product of Nippon Petrochemicals Co., Ltd.

A20. Low density polyethylene, Nisseki Rexlon F312, d=0.925 g/cm³, MFR 2.0, a product of Nippon Petrochemicals Co., Ltd.

A21. Low density polyethylene, Nisseki Rexlon F504, d=0.917 g/cm³, MFR 9.5, a product of Nippon Petrochemicals Co., Ltd.

A22. Ethylene-Ethyl acrylate copolymer, Nisseki Rexlon EEA A3050, MFR 3.0, EA content 5 wt%, a product of Nippon Petrochemicals Co., Ltd.

A23. Ethylene-Ethyl acrylate copolymer, Nisseki Rexlon EEA A3100, MFR 3.0, EA content 10 wt%, a product of Nippon Petrochemicals Co., Ltd.

A24. Ethylene-Ethyl acrylate copolymer, Nisseki Rexlon EEA A3150, MFR 3.0, EA content 15 wt%, a product of Nippon Petrochemicals Co., Ltd.

A25. Ethylene-Ethyl acrylate copolymer, Nisseki Rexlon EEA A4250, MFR 5.0, EA content 25 wt%, a product of Nippon Petrochemicals Co., Ltd.

A26. High density polyethylene, Nisseki Staflene E809(M), d=0.950 g/cm³, MFR 0.9, a product of Nippon Petrochemicals Co., Ltd.

A27. High density polyethylene, Nisseki Staflene E750 (C), d=0.963 g/cm³, MFR 5.3, a product of Nippon Petrochemicals Co., Ltd.

A28. High density polyethylene, Nisseki Staflene E807 (F), d=0.950 g/cm³, MFR 0.6, a product of Nippon Petrochemicals Co., Ltd.

A29. Ethylene-Propylene random copolymer rubber, EP02P, $ML_{1+4}$=24, a product of Japan Synthetic Rubber Co., Ltd.

A30. Ethylene-Propylene random copolymer rubber, EP07P, $ML_{1+4}$=70, a product of Japan Synthetic Rubber Co., Ltd.

A31. Ethylene-Propylene-Diene random copolymer rubber, EP57P, $ML_{1+4}$=88, a product of Japan Synthetic Rubber Co., Ltd.

A32. 6-Nylon, CM1021, a product of Toray Industries Inc.

A33. Polystyrene, Toporex 525, a product of Mitsui Toatsu Chemicals, Inc.

A34. Polybutylene terephthalate, PBT310, a product of Toray Industries Inc.

Carbon Radical Inducing Agent (B1, a compound having an unsaturated bond of a high electron density or a hydrogen donating compound)

α. Ether Compounds

α-1. Dihydropyran, a product of Tokyo Kasei K.K.

α-2. Isopropenyl acetate, a product of Tokyo Kasei K.K.

β. Tetrahydroaromatic Compounds

β-1. 1,2,3,4-Tetrahydronaphthalene, a product of Tokyo Kasei K.K.

β-2. Tetrahydrobenzene, a product of Tokyo Kasei K.K.

β-3. Tetrahydrofuran, a product of Tokyo Kasei K.K.

γ. Cyclopentane Compound

γ-1. Indene

Carbon Radical Inducing Agent (B2, a compound having an unsaturated bond of a low electron density or a hydrogen accepting compound)

δ. Bismaleimide Compound

δ-1. N,N'-m-phenylene bismaleimide, Vulnoc PM, a product of Ohuchi Shinko Kagaku K.K.

ε. Polyol Unsaturated Ester Compound

ε-1. Ethylene glycol dimethacrylate, a product of Tokyo Kasei K.K.

Softening Agent (C)

Super Oil C, a product of Nippon Oil Co., Ltd.

Organic Peroxide (D)

α,α'-Bis-(t-butylperoxy)-m-diisopropylbenzene, Perbutyl P, a product of Nippon Oils & Fats Co., Ltd.

TABLE 1

Combinations of carbon radical inducing agents in the present invention

| Example | B1 | B2 |
|---|---|---|
| Example 1 | α-1 | δ-1 |
| Example 2 | α-2 | δ-1 |
| Example 3 | β-1 | δ-1 |
| Example 4 | β-2 | δ-1 |
| Example 5 | β-3 | δ-1 |
| Example 6 | γ-1 | δ-1 |
| Example 7 | α-1 | ε-1 |

TABLE 1-continued

Combinations of carbon radical inducing agents in the present invention

| Example | B1 | B2 |
|---|---|---|
| Example 8 | α-2 | ε-1 |
| Example 9 | β-1 | ε-1 |
| Example 10 | β-2 | ε-1 |
| Example 11 | β-3 | ε-1 |
| Example 12 | γ-1 | ε-1 |
| Example 13 | α-1 | δ-1 |
| Example 14 | α-2 | δ-1 |
| Example 15 | β-1 | δ-1 |
| Example 16 | β-2 | δ-1 |
| Example 17 | β-3 | δ-1 |
| Example 18 | γ-1 | δ-1 |
| Example 19 | β-1 | ε-1 |
| Example 20 | β-2 | ε-1 |
| Example 21 | β-3 | ε-1 |

TABLE 2

Reaction Using Plastomill

| Comparative Example | (A) | Xylene Insolubles Content (%) | Tensile Strength | Example | Torque | Xylene Insolubles Content (%) | Tensile Strength |
|---|---|---|---|---|---|---|---|
| 1 | 1 | 2.3 | | 1 | ↑ | 37.3 | |
| 2 | 2 | 2.4 | | 2 | ↑ | 59.8 | |
| 3 | 3 | 4.8 | | 3 | ↑ | 26.4 | |
| 4 | 4 | 2.8 | | 4 | → | 9.8 | |
| 5 | 5 | 4.7 | | 5 | → | 11.2 | |
| 6 | 8 | 3.0 | | 6 | → | 4.7 | |
| 7 | 10 | 3.3 | | 7 | → | 16.7 | |
| 8 | 14 | 0.8 | 300 | 8 | → | 7.0 | 400 |
| 9 | 15 | 2.3 | | 9 | → | 23.5 | |
| 10 | 16 | 2.8 | | 10 | → | 6.6 | |
| 11 | 17 | 3.4 | | 11 | → | 19.2 | |
| 12 | 18 | 3.2 | 190 | 12 | → | 7.6 | 270 |
| 13 | 21 | 5.5 | | 13 | → | 28.6 | |
| 14 | 23 | 4.0 | 160 | 14 | → | 6.7 | 210 |
| 15 | 24 | 4.3 | | 15 | → | 16.0 | |
| 16 | 25 | 3.5 | | 16 | → | 17.5 | |
| 17 | 26 | 2.8 | | 17 | ↑ | 47.8 | |
| 18 | 27 | 3.9 | | 18 | ↑ | 26.8 | |
| 19 | 29 | 3.1 | | 19 | ↑ | 41.3 | |
| 20 | 30 | 3.0 | | 20 | ↑ | 58.3 | |
| 21 | 32 | / | | 21 | ↑ | / | |

The unit of tensile strength is kgf/cm$^2$.

TABLE 3

| | Composition | | | | | | | | Conditions for Heat Treatment | | Properties | |
|---|---|---|---|---|---|---|---|---|---|---|---|---|
| | Component (A) | | | | B-1 | | B-2 | | | | Melt Flow Rate | Yield Tensile Strength |
| Example | Kind | Amount (wt %) | Kind | Amount (wt %) | Kind | Amount (wt %) | Kind | Amount (wt %) | Temperature (°C.) | Time (sec) | (g/10 min) | (kgf/cm$^2$) |
| Comparative Example 22 | A11 | 90 | A29 | 10 | — | — | — | — | — | — | 7.0 | 210 |
| Example 22 | A11 | 90 | A29 | 10 | α-1 | 0.05 | δ-1 | 0.1 | 220 | 60 | 5.2 | 240 |
| Comparative Example 23 | A11 | 80 | A29 | 20 | — | — | — | — | — | — | 6.0 | 220 |
| Example 23 | A11 | 80 | A29 | 20 | α-2 | 0.1 | δ-1 | 0.15 | 220 | 60 | 3.1 | 200 |
| Comparative Example 24 | A11 | 80 | A30 | 20 | — | — | — | — | — | — | 4.3 | 200 |
| Example 24 | A11 | 80 | A30 | 20 | β-1 | 0.2 | ε-1 | 0.3 | 180 | 60 | 1.3 | 230 |
| Comparative Example 25 | A11 | 80 | A29 | 20 | — | — | δ-1 | 0.3 | — | — | 2.9 | 200 |
| Comparative Example 26 | A11 | 80 | A29 | 20 | — | — | ε-1 | 0.3 | 220 | 60 | 2.8 | 190 |
| Example 25 | A11 | 80 | A29 | 20 | β-2 | 0.2 | δ-1 | 0.3 | 220 | 60 | 1.5 | 230 |
| Example 26 | A11 | 80 | A29 | 20 | β-3 | 0.2 | δ-1 | 0.3 | 220 | 60 | 1.6 | 230 |

Item / Properties

Ultimate Elongation Length | Flexural Modulus | Vicat Softening Temperature | Izod Impact Value (notched) (kgf/cm$^2$) | Boiling Xylene Insolubles Content | Crystallization Temperature TABLE 3-continued

| Example | (%) | (kgf/cm²) | (°C.) | 23° C. | −10° C. | −30° C. | (wt %) | (°C.) |
|---|---|---|---|---|---|---|---|---|
| Comparative Example 22 | >300 | 10,900 | 143 | >66 | 30.2 | 4.5 | 0.7 | — |
| Example 22 | >300 | 10,800 | 145 | >66 | 50.2 | 10.1 | 7.2 | — |
| Comparative Example 23 | 200 | 9,900 | 135 | >66 | 45.0 | 10.5 | 0.8 | 112.9 |
| Example 23 | >300 | 9,000 | 137 | >66 | >66 | 21.2 | 15.8 | 114.9 |
| Comparative Example 24 | >300 | 9,700 | 134 | >66 | 37.3 | 11.6 | 0.9 | — |
| Example 24 | >300 | 9,500 | 140 | >66 | >66 | 21.9 | 15.9 | — |
| Comparative Example 25 | >300 | 9,900 | 134 | >66 | >66 | 13.0 | 1.5 | — |
| Comparative Example 26 | >300 | 9,500 | 134 | >66 | >66 | 13.1 | 1.5 | — |
| Example 25 | >300 | 9,200 | 140 | >66 | >66 | 55.0 | 11.5 | 116.5 |
| Example 26 | >300 | 9,200 | 139 | >66 | >66 | 47.0 | 11.2 | 116.1 |

TABLE 4

| | Item | | | | | | | | | Properties | |
|---|---|---|---|---|---|---|---|---|---|---|---|
| | Composition | | | | | | | | Conditions for Heat Treatment | | Melt Flow Rate | Yield Tensile Strength |
| | Component (A) | | | | B-1 | | B-2 | | | | | |
| Example | Kind | Amount (wt %) | Kind | Amount (wt %) | Kind | Amount (wt %) | Kind | Amount (wt %) | Temperature (°C.) | Time (sec) | (g/10 min) | (kgf/cm²) |
| Comparative Example 27 | A6 | 100 | — | — | — | — | — | — | — | — | 8.2 | 350 |
| Comparative Example 28 | A6 | 80 | A30 | 20 | — | — | — | — | — | — | 4.5 | 210 |
| Example 27 | A6 | 80 | A30 | 20 | β-3 | 0.2 | δ-1 | 0.4 | 220 | 120 | 1.5 | 230 |
| Comparative Example 29 | A6 | 80 | A20 | 20 | β-1 | 0.2 | — | — | 180 | 60 | 5.0 | 210 |
| Comparative Example 30 | A6 | 80 | A29 | 20 | β-2 | 0.2 | — | — | 180 | 60 | 5.1 | 210 |
| Comparative Example 31 | A6 | 80 | A29 | 20 | β-3 | 0.2 | — | — | 180 | 60 | 5.0 | 210 |
| Example 28 | A6 | 80 | A29 | 20 | β-1 | 0.2 | δ-1 | 0.3 | 180 | 60 | 2.5 | 230 |
| Example 29 | A6 | 80 | A29 | 20 | β-2 | 0.2 | δ-1 | 0.4 | 180 | 60 | 2.9 | 230 |
| Example 30 | A6 | 80 | A29 | 20 | β-3 | 0.2 | δ-1 | 0.3 | 180 | 60 | 2.5 | 230 |
| Example 31 | A6 | 80 | A29 | 20 | α-1 | 0.1 | ε-1 | 0.15 | 220 | 60 | 2.7 | 210 |
| Example 32 | A6 | 80 | A29 | 20 | α-2 | 0.1 | ε-1 | 0.15 | 220 | 30 | 2.8 | 210 |
| Example 33 | A6 | 80 | A29 | 20 | γ-1 | 0.05 | ε-1 | 0.08 | 220 | 60 | 3.0 | 210 |
| Comparative Example 32 | A15 | 80 | A30 | 20 | — | — | — | — | — | — | 5.0 | 92 |
| Example 34 | A15 | 80 | A30 | 20 | γ-1 | 0.2 | δ-1 | 0.4 | 180 | 60 | 1.3 | 98 |

| | Item | | | | | | |
|---|---|---|---|---|---|---|---|
| | Properties | | | | | | |
| | Ultimate Elongation Length | Flexural Modulus | Vicat Softening Temperature | Izod Impact Value (notched) (kgf/cm²) | | | Boiling Xylene Insolubles Content | Crystallization Temperature |
| Example | (%) | (kgf/cm²) | (°C.) | 23° C. | −10° C. | −30° C. | (wt %) | (°C.) |
| Comparative Example 27 | >300 | 17,500 | 151 | 12.2 | 5.3 | 5.1 | 1.6 | 111.5 |
| Comparative Example 28 | >300 | 11,200 | 135 | >66 | 11.2 | 10.3 | 1.6 | 113.0 |
| Example 27 | >300 | 10,700 | 138 | >66 | 21.6 | 16.1 | 15.1 | 116.2 |
| Comparative Example 29 | >300 | 9,200 | 136 | >66 | 10.5 | 8.2 | 1.2 | 112.1 |
| Comparative Example 30 | >300 | 9,500 | 136 | >66 | 10.3 | 7.6 | 1.2 | 112.0 |
| Comparative Example 31 | >300 | 9,300 | 136 | >66 | 10.3 | 7.3 | 1.9 | 112.0 |
| Example 28 | >300 | 9,100 | 140 | >66 | >66 | 19.2 | 10.2 | 112.3 |
| Example 29 | >300 | 9,100 | 140 | >66 | >66 | 18.6 | 9.2 | 112.2 |
| Example 30 | >300 | 9,100 | 140 | >66 | >66 | 22.0 | 8.2 | 112.0 |
| Example 31 | >300 | 9,100 | 139 | >66 | >66 | 31.8 | 13.5 | 116.5 |
| Example 32 | >300 | 9,100 | 137 | >66 | >66 | 20.8 | 12.1 | 116.2 |
| Example 33 | >300 | 9,200 | 138 | >66 | >66 | 14.9 | 12.1 | 116.2 |
| Comparative Example 32 | >300 | 1,800 | 128 | >66 | >66 | >66 | 0.9 | — |
| Example 34 | >300 | 1,700 | 134 | >66 | >66 | >66 | 17.5 | — |

TABLE 5

| Example | Component (A) Kind | Component (A) Amount (wt %) | Kind | Amount (wt %) | B-1 Kind | B-1 Amount (wt %) | B-2 Kind | B-2 Amount (wt %) | Conditions for Heat Treatment Temperature (°C.) | Time (sec) | Melt Flow Rate (g/10 min) | Yield Tensile Strength (kgf/cm²) |
|---|---|---|---|---|---|---|---|---|---|---|---|---|
| Comparative Example 33 | A4 | 100 | — | — | — | — | — | — | — | — | — | 330 |
| Comparative Example 34 | A4 | 80 | A30 | 20 | — | — | — | — | — | — | — | 220 |
| Example 35 | A4 | 80 | A30 | 20 | β-1 | 0.2 | δ-1 | 0.3 | 180 | 60 | — | 240 |
| Comparative Example 35 | A4 | 65 | A29 | 35 | — | — | — | — | — | — | — | 195 |
| Example 36 | A4 | 65 | A29 | 35 | β-2 | 0.3 | δ-1 | 0.5 | 220 | 60 | — | 180 |
| Comparative Example 36 | A9 | 100 | — | — | — | — | — | — | — | — | — | 230 |
| Example 37 | A9 | 80 | A29 | 20 | α-1 | 0.2 | ε-1 | 0.4 | 220 | 60 | — | 180 |
| Example 38 | A9 | 80 | A29 | 20 | α-2 | 0.2 | ε-1 | 0.3 | 220 | 60 | — | 180 |
| Comparative Example 37 | A13 | 100 | — | — | — | — | — | — | — | — | — | 280 |
| Comparative Example 38 | A13 | 80 | A30 | 20 | — | — | — | — | — | — | — | 190 |
| Example 39 | A13 | 80 | A30 | 20 | γ-1 | 0.2 | ε-1 | 0.3 | 180 | 60 | — | 185 |
| Comparative Example 39 | A13 | 80 | A29 | 20 | — | — | — | — | — | — | 13.5 | 210 |
| Example 40 | A13 | 80 | A29 | 20 | β-1 | 0.2 | δ-1 | 0.3 | 180 | 60 | 6.3 | 210 |
| Comparative Example 40 | A12 | 80 | A29 | 20 | — | — | — | — | — | — | 11.0 | 180 |
| Example 41 | A12 | 80 | A29 | 20 | β-1 | 0.2 | δ-1 | 0.3 | 220 | 60 | 5.0 | 190 |
| Comparative Example 41 | A12 | 80 | A30 | 20 | — | — | — | — | — | — | 9.0 | 180 |
| Example 42 | A12 | 80 | A30 | 20 | β-1 | 0.1 | δ-1 | 0.1 | 220 | 60 | 6.1 | 180 |
| Comparative Example 42 | A28 | 100 | — | — | — | — | — | — | — | — | — | — |
| Comparative Example 43 | A28 | 80 | A30 | 20 | — | — | — | — | — | — | — | — |
| Example 43 | A28 | 80 | A30 | 20 | β-1 | 0.2 | δ-1 | 0.3 | 190 | 75 | — | — |
| Comparative Example 44 | A33 | 100 | — | — | — | — | — | — | — | — | — | — |
| Comparative Example 45 | A33 | 80 | A29 | 20 | — | — | — | — | — | — | — | — |
| Example 44 | A33 | 80 | A29 | 20 | β-1 | 0.2 | δ-1 | 0.3 | 190 | 60 | — | — |
| Comparative Example 46 | A32 | 100 | — | — | — | — | — | — | — | — | — | 720 |
| Comparative Example 47 | A32 | 80 | A30 | 20 | — | — | — | — | — | — | — | 400 |
| Example 45 | A32 | 80 | A30 | 20 | β-1 | 0.3 | δ-1 | 0.3 | 260 | 60 | — | 420 |
| Comparative Example 48 | A34 | 100 | — | — | — | — | — | — | — | — | — | 530 |
| Comparative Example 49 | A34 | 80 | A30 | 20 | — | — | — | — | — | — | — | 320 |
| Example 46 | A34 | 80 | A30 | 20 | β-1 | 0.3 | δ-1 | 0.3 | 260 | 60 | — | 310 |

| Example | Ultimate Elongation Length (%) | Flexural Modulus (kgf/cm²) | Vicat Softening Temperature (°C.) | Izod Impact Value (notched) (kgf/cm²) 23° C. | Izod Impact Value (notched) (kgf/cm²) −10° C. | Izod Impact Value (notched) (kgf/cm²) −30° C. | Boiling Xylene Insolubles Content (wt %) | Crystallization Temperature (°C.) |
|---|---|---|---|---|---|---|---|---|
| Comparative Example 33 | >300 | 15,500 | 150 | 8.2 | 3.6 | 3.3 | 0.4 | 114.7 |
| Comparative Example 34 | 220 | 11,300 | 141 | 23.2 | 6.6 | 6.2 | 0.8 | 112.9 |
| Example 35 | >330 | 11,300 | 143 | 58.9 | 14.0 | 9.0 | 10.1 | 114.5 |
| Comparative Example 35 | >300 | 9,200 | 131 | >66 | 15.0 | 10.8 | 1.2 | — |
| Example 36 | >300 | 8,900 | 135 | >66 | >66 | >66 | 21.0 | — |
| Comparative Example 36 | >300 | 9,000 | 118 | 25.3 | 6.5 | 6.2 | 0.8 | 111.1 |
| Example 37 | >300 | 7,000 | 100 | 59.2 | 8.2 | 7.4 | 11.8 | 109.4 |
| Example 38 | >300 | 6,800 | 101 | 63.8 | 15.8 | 10.7 | 9.5 | 109.4 |
| Comparative Example 37 | 100 | 14,500 | 148 | 10.1 | 5.6 | 5.2 | 1.3 | — |
| Comparative Example 38 | 120 | 11,800 | 132 | 28.1 | 8.0 | 7.0 | 1.6 | — |
| Example 39 | 200 | 11,000 | 137 | 40.7 | 13.2 | 9.1 | 18.5 | — |
| Comparative Example 39 | 130 | 12,000 | 134 | 23.3 | 7.3 | 6.3 | 1.6 | — |

TABLE 5-continued

| | | | | | | | | |
|---|---|---|---|---|---|---|---|---|
| Example 40 | 180 | 11,900 | 138 | 29.3 | 9.9 | 8.1 | 17.0 | — |
| Comparative Example 40 | 70 | 10,800 | 135 | 18.0 | 9.0 | 8.2 | 1.8 | — |
| Example 41 | 190 | 10,000 | 140 | 61.6 | 13.2 | 11.3 | 17.0 | — |
| Comparative Example 41 | 60 | 10,500 | 136 | 18.0 | 9.2 | 8.0 | 0.9 | — |
| Example 42 | 190 | 10,500 | 140 | >66 | 20.8 | 12.0 | 16.8 | — |
| Comparative Example 42 | — | 13,000 | — | — | — | 4.5 | 0.8 | — |
| Comparative Example 43 | — | 9,100 | — | — | — | 20.1 | 1.3 | — |
| Example 43 | — | 9,000 | — | — | — | 51.3 | 13.2 | — |
| Comparative Example 44 | — | 29,500 | — | — | — | 2.0 | 1.0 | — |
| Comparative Example 45 | — | 21,000 | — | — | — | 5.5 | 1.7 | — |
| Example 44 | — | 20,700 | — | — | — | 21.0 | 11.0 | — |
| Comparative Example 46 | 220 | 26,100 | — | 4.5 | — | — | 98.8 | — |
| Comparative Example 47 | 30 | 22,000 | — | 5.9 | — | — | 80.8 | — |
| Example 45 | 180 | 22,300 | — | 36.9 | — | — | 90.6 | — |
| Comparative Example 48 | 250 | 24,300 | — | 6.0 | — | — | 98.5 | — |
| Comparative Example 49 | 130 | 15,600 | — | 20.8 | — | — | 79.9 | — |
| Example 46 | 280 | 15,000 | — | 33.0 | — | — | 90.8 | — |

TABLE 6

| | Composition | | | | | | |
|---|---|---|---|---|---|---|---|
| | Component (A) | | | | Softening Agent (C) | B-1 | |
| Example | Kind | Amount (wt %) | Kind | Amount (wt %) | Amount (wt %) | Kind | Amount (wt %) |
| Comparative Example 50 | A1 | 70 | A29 | 30 | — | — | — |
| Example 47 | A1 | 70 | A29 | 30 | — | α-1 | 0.3 |
| Example 48 | A1 | 70 | A29 | 30 | 20 | α-1 | 0.3 |
| Comparative Example 51 | A1 | 70 | A29 | 30 | — | D* | 0.1 |
| Comparative Example 52 | A1 | 70 | A29 | 30 | — | D* | 0.3 |
| Comparative Example 53 | A2 | 70 | A30 | 30 | — | — | — |
| Example 49 | A2 | 70 | A30 | 30 | — | α-1 | 0.3 |
| Example 50 | A2 | 70 | A30 | 30 | — | α-1 | 0.3 |
| Comparative Example 54 | A2 | 70 | A29 | 30 | — | — | — |
| Example 51 | A2 | 70 | A29 | 30 | — | α-1 | 0.3 |
| Comparative Example 55 | A3 | 90 | A30 | 10 | — | — | — |
| Example 52 | A3 | 90 | A30 | 10 | — | α-1 | 0.11 |
| Comparative Example 56 | A3 | 70 | A30 | 30 | — | — | — |
| Example 53 | A3 | 70 | A30 | 30 | — | γ-1 | 0.4 |
| Example 54 | A3 | 70 | A30 | 30 | 20 | γ-1 | 0.4 |

| | | | Item | | | | |
|---|---|---|---|---|---|---|---|
| | B-2 | | Conditions for Heat Treatment | | Properties | | |
| | | | Temperature | Time | High Load MFR | Ultimate Tensile Strength | Ultimate Elongation Length | Flexural Modulus |
| Example | Kind | Amount (wt %) | (°C.) | (sec) | (g/10 min) | (kgf/cm²) | (%) | (kgf/cm²) |
| Comparative Example 50 | — | — | — | — | 20 | 50 | >300 | 700 |
| Example 47 | δ-1 | 0.4 | 220 | 70 | 7 | 150 | >300 | 840 |
| Example 48 | δ-1 | 0.4 | 220 | 70 | 11 | 142 | >300 | 590 |
| Comparative Example 51 | — | — | 220 | 70 | 1 | 80 | 100 | 800 |
| Comparative Example 52 | δ-1 | 0.3 | 220 | 70 | unmoldable | — | >300 | — |
| Comparative Example 53 | — | — | — | — | 5 | 60 | >300 | 920 |
| Example 49 | — | — | 180 | 75 | 2 | 91 | >300 | 950 |
| Example 50 | ε-1 | 0.4 | 180 | 75 | 0.8 | 115 | >300 | 950 |
| Comparative Example 54 | — | — | — | — | 8 | 50 | >300 | 700 |
| Example 51 | ε-1 | 0.4 | 180 | 60 | 5 | 80 | >300 | 700 |

TABLE 6-continued

| Example | Kind | Amount | Temp | Time | (col5) | (col6) | (col7) | (col8) |
|---|---|---|---|---|---|---|---|---|
| Comparative Example 55 | — | — | — | — | — | 150 | >300 | 1050 |
| Example 52 | ε-1 | 0.11 | 180 | 60 | 18 | 160 | >300 | 1150 |
| Comparative Example 56 | — | — | — | — | 27 | 105 | >300 | 650 |
| Example 53 | δ-1 | 0.5 | 180 | 60 | 8 | 110 | >300 | 700 |
| Example 54 | δ-1 | 0.5 | 180 | 60 | 36 | 110 | >300 | 700 |

| Example | Durometer Hardness ($H_DA$) | Permanent Elongation (100% elongation) (%) | Vicat Softening Temperature (°C.) | Brittle Temperature (°C.) | Boiling Xylene Insolubles Content (wt %) | Abrasion Resistance (Taber abrasion index) (mg/1000 rev.) |
|---|---|---|---|---|---|---|
| Comparative Example 50 | 78 | 35 | 60 | < −70 | 1.8 | — |
| Example 47 | 90 | 18 | 88 | < −70 | 25.6 | — |
| Example 48 | 81 | 18 | 79 | < −70 | 20.5 | — |
| Comparative Example 51 | 89 | 20 | 75 | < −70 | 42.1 | — |
| Comparative Example 52 | — | — | — | — | — | — |
| Comparative Example 53 | 83 | 38 | 58 | < −70 | 1.5 | — |
| Example 49 | 85 | 18 | 74 | < −70 | 14.1 | — |
| Example 50 | 88 | 17 | 83 | < −70 | 28.5 | — |
| Comparative Example 54 | 71 | 35 | 58 | < −70 | 0.8 | — |
| Example 51 | 75 | 28 | 67 | < −70 | 7.1 | — |
| Comparative Example 55 | 96 | 35 | 100 | — | 1.1 | 19 |
| Example 52 | >98 | 30 | 110 | — | 7.6 | 9 |
| Comparative Example 56 | 84 | 25 | 81 | — | 0.9 | 25 |
| Example 53 | 88 | 21 | 101 | — | 30.0 | 10 |
| Example 54 | 84 | 18 | 90 | — | 24.7 | 10 |

D* organic peroxide

TABLE 7

| Example | Component (A) Kind | Amount (wt %) | Kind | Amount (wt %) | Kind | Amount (wt %) | Softening Agent Amount (wt %) | B-1 Kind | Amount (wt %) | B-2 Kind | Amount (wt %) |
|---|---|---|---|---|---|---|---|---|---|---|---|
| Example 55 | A7 | 55 | A19 | 12 | A30 | 33 | 20 | γ-1 | 0.45 | δ-1 | 0.50 |
| Comparative Example 57 | A7 | 55 | A19 | 12 | A30 | 33 | 20 | D* | 0.30 | δ-1 | 0.30 |
| Example 56 | A9 | 65 | A20 | 10 | A29 | 25 | 10 | α-1 | 0.25 | ε-1 | 0.30 |
| Example 57 | A9 | 57 | A20 | 10 | A29 | 33 | 20 | α-2 | 0.40 | ε-1 | 0.45 |
| Example 58 | A11 | 67 | — | — | A30 | 33 | 20 | β-1 | 0.45 | δ-1 | 0.50 |
| Example 59 | A13 | 67 | — | — | A30 | 33 | 20 | β-2 | 0.45 | δ-1 | 0.50 |
| Example 60 | A11 | 55 | A3 | 15 | A29 | 30 | 20 | β-3 | 0.30 | δ-1 | 0.35 |
| Example 61 | A12 | 57 | A22 | 10 | A31 | 33 | 20 | γ-1 | 0.45 | δ-1 | 0.50 |
| Comparative Example 58 | A12 | 57 | A22 | 10 | A31 | 33 | 20 | D* | 0.30 | δ-1 | 0.30 |
| Example 62 | A11 | 40 | A3 | 30 | A31 | 30 | 20 | α-1 | 0.30 | δ-1 | 0.35 |

| Example | Conditions for Heat Treatment Temperature (°C.) | Time (sec) | Spiral Flow (mm) | Ultimate Tensile Strength (kgf/cm$^2$) | Ultimate Elongation Length (%) | Bending Strength (kgf/cm$^2$) | Flexural Modulus (kgf/cm$^2$) | Durometer Hardness ($H_DD$) [$H_DA$] |
|---|---|---|---|---|---|---|---|---|
| Example 55 | 240 | 60 | — | 110 | 550 | 62 | 2,100 | 45 |
| Comparative Example 57 | 240 | 60 | — | 93 | 450 | 57 | 1,800 | 44 |
| Example 56 | 240 | 60 | — | 194 | 480 | 118 | 4,200 | 52 |
| Example 57 | 240 | 60 | — | 155 | 480 | 72 | 2,370 | 46 |
| Example 58 | 240 | 60 | 760 | 120 | 550 | 88 | 2,950 | 45 |
| Example 59 | 240 | 60 | 880 | 120 | 550 | 88 | 2,800 | 45 |
| Example 60 | 240 | 60 | 700 | 132 | 550 | 88 | 3,050 | 48 |
| Example 61 | 240 | 60 | 660 | 135 | 550 | 95 | 3,300 | 47 |
| Comparative Example 48 | 240 | 60 | 550 | 100 | 400 | 70 | 2,450 | 44 |
| Example 62 | 240 | 60 | 552 | 109 | 540 | 45 | 1,520 | [95] |

TABLE 7-continued

| Example | Permanent Elongation (100% elongation) (%) | Vicat Softening Temperature (°C) | Izod Impact Value (notched) (kgf/cm²) -30°C | Izod Impact Value (notched) (kgf/cm²) -40°C | Boiling Xylene Insolubles Content (wt %) | Surface Roughening and Elongation of Parison |
|---|---|---|---|---|---|---|
| Example 55 | 51 | 63 | >66 | >66 | 21.2 | ○ |
| Comparative Example 57 | 42 | 58 | >66 | 44.0 | 41.0 | X |
| Example 56 | 45 | 112 | >66 | >66 | 22.2 | ⊚ |
| Example 57 | 38 | 91 | >66 | >66 | 25.3 | ⊚ |
| Example 58 | 47 | 92 | >66 | >66 | 22.1 | |
| Example 59 | 44 | 92 | >66 | >66 | 21.0 | |
| Example 60 | 48 | 91 | >66 | >66 | 22.5 | |
| Example 61 | 48 | 82 | >66 | >66 | 25.0 | |
| Comparative Example 58 | 49 | 83 | >66 | 46.0 | 35.0 | |
| Example 62 | 33 | 67 | >66 | >66 | 22.1 | |

D* organic peroxide

What is claimed is:

1. A partially crosslinked thermoplastic resin composition comprising the product prepared by dynamically heat-treating, in the absence of a peroxide initiator, (A) a crystalline polyolefin resin and a rubbery substance in the presence of (B) a carbon radical inducing agent comprising a charge transfer complex or a combination of a hydrogen donating compound, said hydrogen donating compound selected from the group consisting of ether compounds, tetrahydroaromatic compounds, cyclopentane compounds and mixtures thereof, and a hydrogen accepting compound, said hydrogen accepting compound selected from the group consisting of bismaleamide compounds, polyol unsaturated ester compounds and mixtures thereof.

2. A partially crosslinked, thermoplastic resin composition as set forth in claim 1, wherein the carbon radical inducing agent is incorporated in the thermoplastic resin (A) in an amount of 0.01 to 7 parts by weight per 100 parts by weight of the thermoplastic resin (A).

3. A partially crosslinked thermoplastic resin composition as set forth in claim 1 wherein the polyolefin resin is selected from propylene (co)polymer and an ethylene (co)polymer.

4. A partially crosslinked thermoplastic resin composition as set forth in claim 1, wherein the rubbery substance comprises an ethylene-propylene random copolymer rubber and/or an ethylene-propylene-diene random copolymer rubber.

5. A partially crosslinked thermoplastic resin composition as set forth in claim 1, wherein a softening agent is added to the thermoplastic resin composition.

* * * * *